United States Patent
Demtröder et al.

(10) Patent No.: US 12,247,551 B2
(45) Date of Patent: Mar. 11, 2025

(54) ROOFTOP CONTAINERIZED HVAC MODULE FOR WIND TURBINE GENERATOR

(71) Applicant: Vestas Wind Systems A/S, Aarhus (DK)

(72) Inventors: Jens Demtröder, Rønde (DK); Torben Ladegaard Baun, Skødstrup (DK); Jesper Nyvad, Egå (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/276,682

(22) PCT Filed: Feb. 9, 2022

(86) PCT No.: PCT/DK2022/050023
§ 371 (c)(1),
(2) Date: Aug. 10, 2023

(87) PCT Pub. No.: WO2022/171256
PCT Pub. Date: Aug. 18, 2022

(65) Prior Publication Data
US 2024/0133365 A1 Apr. 25, 2024
US 2024/0229774 A9 Jul. 11, 2024

(30) Foreign Application Priority Data
Feb. 11, 2021 (DK) .............. PA 2021 70062

(51) Int. Cl.
*F03D 80/60* (2016.01)
(52) U.S. Cl.
CPC ........ *F03D 80/60* (2016.05); *F05B 2240/142* (2013.01); *F05B 2260/20* (2013.01)
(58) Field of Classification Search
CPC ......... F03D 1/101; F03D 13/116; F03D 80/60
See application file for complete search history.

(56) References Cited

U.S. PATENT DOCUMENTS

2010/0034653 A1 2/2010 Frokjaer
2012/0139256 A1* 6/2012 Gajewski ............... F03D 80/00
290/55
(Continued)

FOREIGN PATENT DOCUMENTS

EP 2063119 A2 5/2009
EP 2520798 A1 11/2012
(Continued)

OTHER PUBLICATIONS

International Searching Authority, International Search Report and Written Opinion issued in corresponding PCT Application No. PCT/DK2022/050023, mailed May 24, 2022.
(Continued)

*Primary Examiner* — Brian O Peters
(74) *Attorney, Agent, or Firm* — Wood Herron & Evans LLP

(57) ABSTRACT

A wind turbine generator (10) includes a tower (12), a nacelle (14) rotatably mounted to the tower (12), the nacelle having a longitudinal axis and being configured to align the longitudinal axis with the direction of the incoming wind during operation of the wind turbine generator (10), one or more heat-generating components (22) housed in the wind turbine generator (10), and a containerized HVAC module (26) mounted on a roof (31) of the nacelle (14) and operably connected to the one or more heat-generating h components (22) for cooling the heat-generating components (22). The module (26) includes a shipping container (30) having a floor (32), a roof (34), a pair opposed longer side walls (36), a pair of opposed shorter end walls (38), and a longitudinal axis, the longitudinal axis of the shipping container (30) being oriented generally perpendicular to the longitudinal axis of the nacelle (14), the shipping container (30) having at least one heat exchanger (40) therein.

18 Claims, 12 Drawing Sheets

(56) References Cited

U.S. PATENT DOCUMENTS

2013/0309090 A1\* 11/2013 Abolfazlian ............ F01D 25/12
　　　　　　　　　　　　　　　　　　　　　　　　　416/1
2022/0349383 A1\* 11/2022 Baun ....................... F03D 80/50

FOREIGN PATENT DOCUMENTS

| EP | 2573387 A1 | 3/2013 |
| EP | 2639450 A1 | 9/2013 |
| EP | 3247899 A1 | 11/2017 |
| EP | 3276169 A1 | 1/2018 |
| EP | 3680481 A1 | 7/2020 |
| EP | 3736441 A1 | 11/2020 |
| WO | 2016116112 A1 | 7/2016 |
| WO | 2020126860 A1 | 6/2020 |

OTHER PUBLICATIONS

Danish Patent and Trademark Office, technical examination report of corresponding DK Application No. PA 2021 70062, dated Aug. 9, 2021.

\* cited by examiner

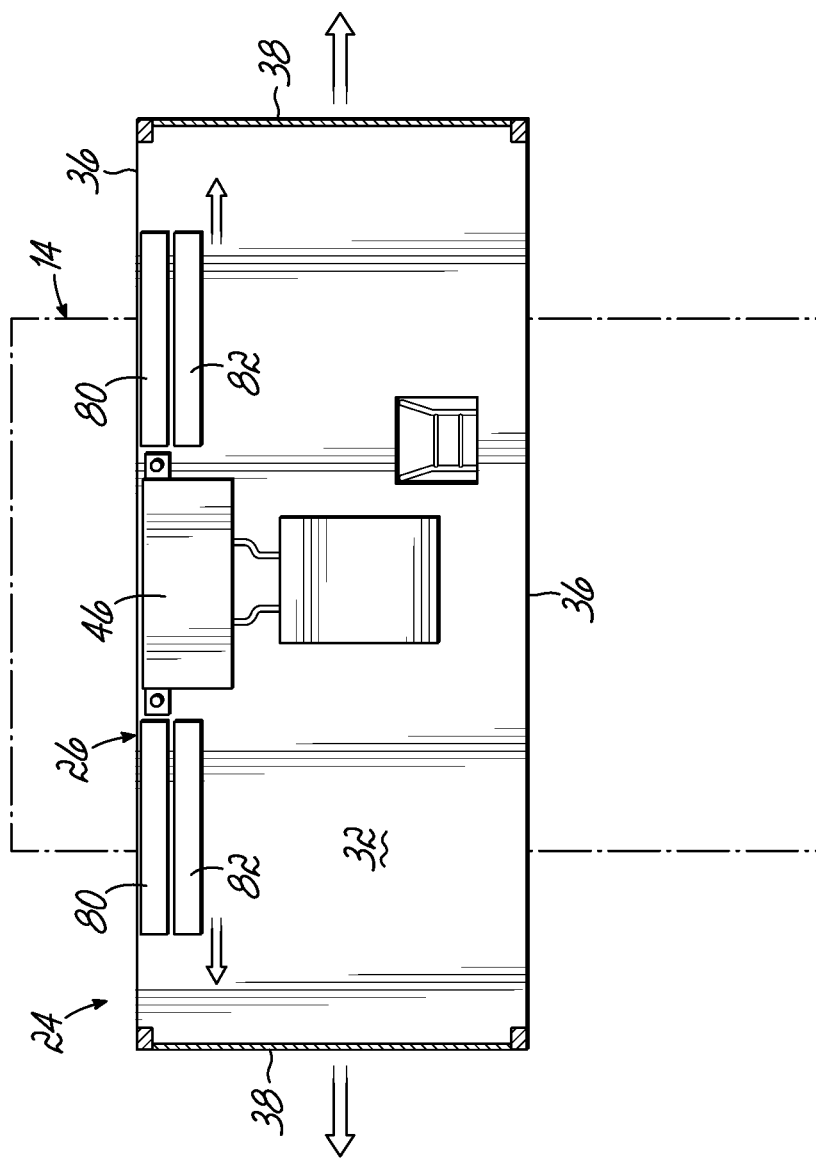

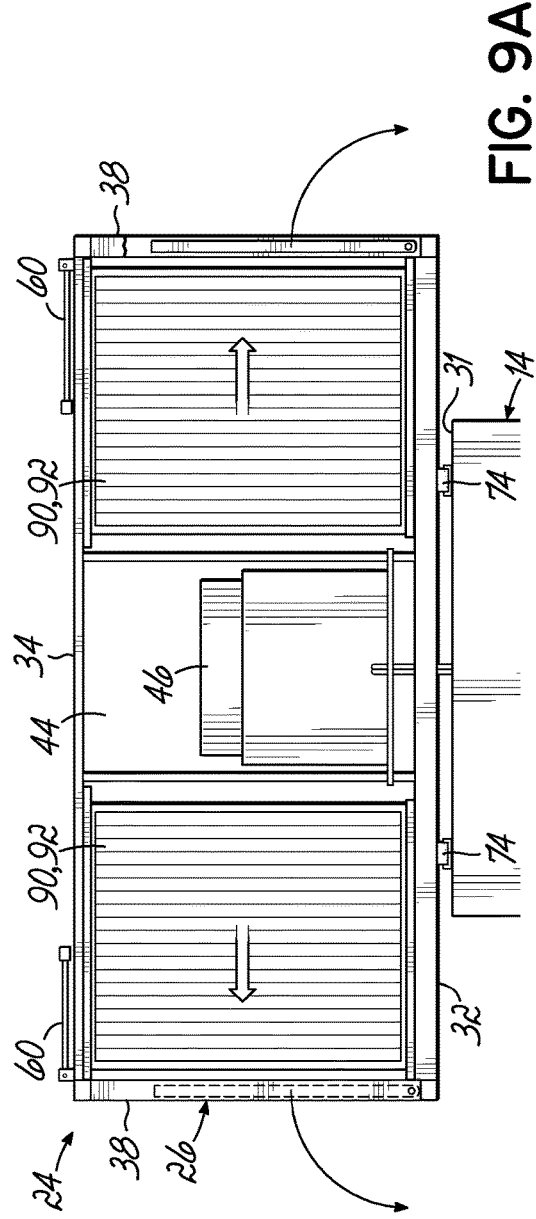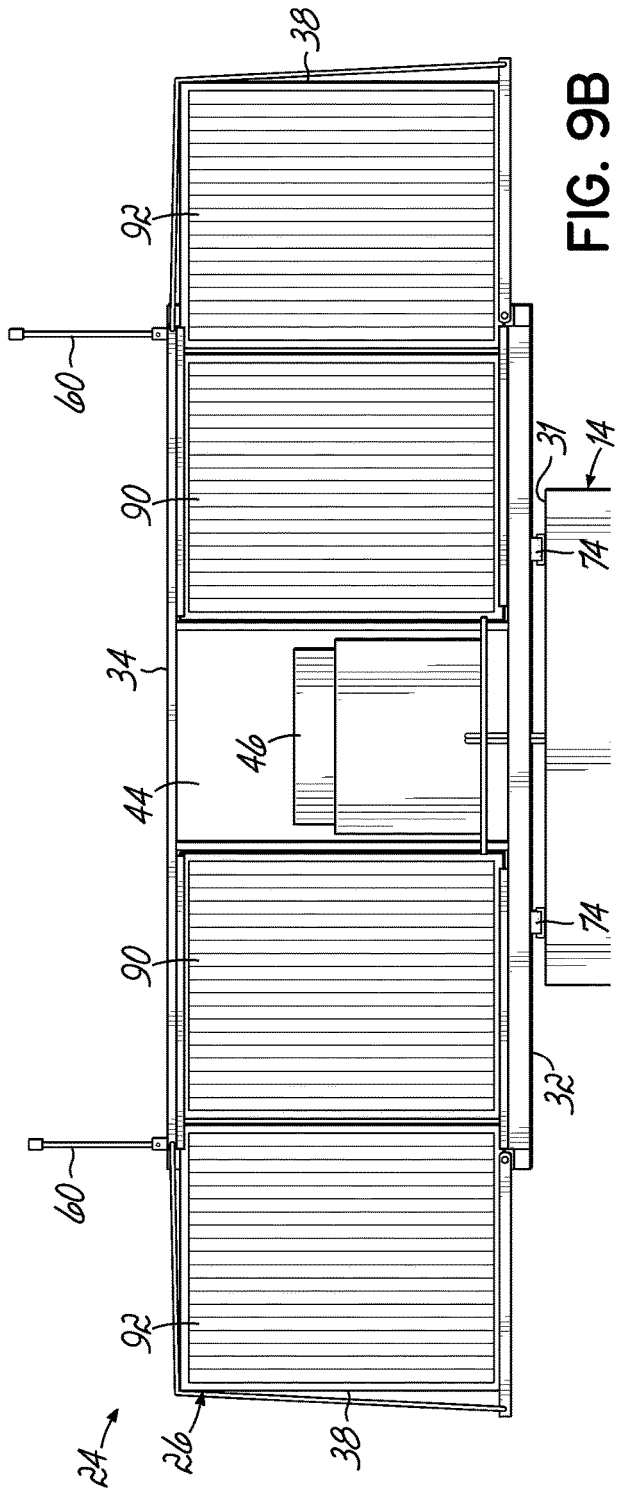

ROOFTOP CONTAINERIZED HVAC MODULE FOR WIND TURBINE GENERATOR

TECHNICAL FIELD

This invention relates generally to wind turbine generators, and more particularly to HVAC systems for wind turbine generators.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

Components of the generator located within the nacelle generate significant heat during operation, which in turn, causes the temperature of the air in the nacelle and the generator components to increase. When the generator components are heated, the overall efficiency of power generation may be decreased. Therefore, the generator components and the nacelle may be cooled to ensure that the heat does not adversely affect power generation and/or damage the components.

Conventional wind turbines may include one or more cooling devices configured to remove the heat generated during operation of the wind turbine. The cooling devices may include standard heat sinks. Another exemplary cooling device is a cooler top positioned along one side (e.g., the roof or sides) of the nacelle and including one or more panels partially enclosed by a cover. The air flowing past the wind turbine cools a second fluid flowing through the panels, the second fluid being directed to other heat exchangers within the nacelle to remove heat from generator components and the nacelle. To this end, the cooling devices operate to thereby reduce the temperature of the nacelle and the generator components.

These present cooler top designs place the liquid/air heat exchangers in the free air flow region on top of the nacelle. All other components related to the heating, ventilation, air conditioning, and cooling ("HVAC") system, such as circulation pumps or fans and the related power supply and supervision equipment, are placed inside the nacelle.

As the power production per wind turbine increases, so does the required cooling capacity. Higher cooling capacity may be realized by adding additional coolers. However, creating performance steps in terms of power rating and temperature capability causes design changes in multiple modules.

Thus, there is a need for a cooler top design that is scalable without causing design changes in multiple modules.

SUMMARY

In one aspect, a wind turbine generator comprises a tower, a nacelle rotatably mounted to the tower, the nacelle having a longitudinal axis and being configured to align the longitudinal axis with the direction of the incoming wind during operation of the wind turbine generator, one or more heat-generating components housed in the wind turbine generator, and a containerized HVAC module mounted on a roof of the nacelle and operably connected to the one or more heat-generating components for cooling the heat-generating components.

The module can comprise a shipping container having a floor, a roof, a pair opposed longer side walls, a pair of opposed shorter end walls, and a longitudinal axis, the longitudinal axis of the shipping container being oriented generally perpendicular to the longitudinal axis of the nacelle, the shipping container having at least one heat exchanger therein.

The module can further have a machine room therein, the machine room comprising at least one of pumps, tanks, expansion vessels, valves, fans, and/or spillage trays.

The floor of the shipping container can function as a working platform during service and maintenance, the floor comprising a grating or a deck, the module including safety railings around the grating or deck.

The side walls, end walls, and/or roof of the shipping container include openable or removable portions to permit air flow through the shipping container and the at least one heat exchanger during operation.

The module can further include one or more of water/air heat exchangers, pumps for circulation of water between the water/air heat exchangers and heat exchangers on water-cooled modules in the nacelle, fans and/or blowers for circulating air between ambient and air-cooled modules in the nacelle, fans and/or blowers for ventilating internals of the nacelle, a filtration system for removing particles, salt, and/or humidity from the air, hoses and/or ducts for guiding flow of liquid and air, a fire suppression system for extinguishing fires in the nacelle, mufflers and/or silencers for reducing noise emissions into the environment, and related power supplies, surveillance, and control equipment.

The module can further include releasable connection means for releasably connecting the module to the roof of the nacelle, the releasable connection means reducing structural loads from being transmitted from the module to the nacelle by providing an amount of at least one of six degrees-of-freedom structural independence between the module and the nacelle.

The module can further include sliding and/or pivoting heat exchangers configured to slide and/or pivot through or out of openable or removable sections of the end walls of the container, the sliding and/or pivoting heat exchangers positionable within the envelope of the container for shipping, and deployable to an operable position once the module is mounted to the nacelle, thereby providing a scalable capability to the module.

In another aspect, a containerized HVAC module is configured to be mounted on a roof of a nacelle of a wind turbine generator, and is configured to be operably connected to one or more heat-generating components in the wind turbine generator for cooling the heat-generating components.

In another aspect, a group has at least two containerized HVAC modules, wherein one of said modules is a base module connected to the nacelle and the other of the modules is an extension module connected to the base module.

The base module can have the machine room, and the extension module can have only heat exchangers.

In another aspect, a wind turbine generator comprises a tower, a nacelle rotatably mounted to the tower, the nacelle having a longitudinal axis and being configured to align the longitudinal axis with the direction of the incoming wind during operation of the wind turbine generator, one or more heat-generating components housed in the wind turbine generator, and the aforementioned group of containerized HVAC modules.

In another aspect, a method comprises providing a plurality of containerized HVAC modules, each module having a different cooling capacity, determining the cooling requirement of a particular wind turbine generator from the power rating of the wind turbine generator and the weather conditions the wind turbine generator will be subjected to, selecting the containerized HVAC module from the plurality of containerized HVAC modules that has a cooling capacity at least as great as the cooling requirement of the particular wind turbine generator, and installing the selected containerized HVAC module on the wind turbine generator.

The accompanying drawings, which are incorporated in and constitute a part of this specification, illustrate embodiments of the invention and, together with the summary of the invention given above, and the detailed description of the drawings given below, serve to explain the principles of the present invention.

BRIEF DESCRIPTION OF THE DRAWINGS

FIG. 8A is a cross-sectional view taken along line 8A-8A in FIG. 7A.

FIG. 9A is a front view of a fourth embodiment of the modular rooftop HVAC system having additional heat exchangers pivotable into and out of the ends of the shipping container, the additional heat exchangers shown in the retracted stowed position.

FIG. 9B is a view similar to FIG. 9A illustrating the additional heat exchangers in the extended deployed position.

DETAILED DESCRIPTION

The aim of the invention is to place HVAC items that are influenced by heat loss of the wind turbine generator vs. wind speed, and ambient temperature vs. wind speed, and their related power supply, controls, and supervision equipment in one containerized module placed in a transverse or crosswise direction on top of the nacelle. Thereby, wind turbine generator variants for different temperature classes can be configured by merely changing the rooftop containerized HVAC module while the rest of the nacelle remains a standard unit in volume production.

A shipping freight container is also referred to as an intermodal container, a standard freight container, a box container, a sea freight container, an ISO container, a standard shipping container, a standard container, or simply a container, and refers in general to a container used to store and move materials and products in the global containerized intermodal freight transport system for intercontinental traffic, and which follows the dimensional and structural specifications in the ISO standard of ISO 668—Series 1 Freight Containers—Classification, Dimensions and Ratings. ISO 668 is an ISO international standard which classifies intermodal freight shipping containers and standardizes their size and weight specifications, regulates their external and internal dimensions, and specifies their associated gross weight ratings and requirements for load transfer areas.

As used herein, the term "shipping container" shall embrace all of the terms "intermodal container", "standard freight container", "box container", "sea freight container", "ISO container", "standard shipping container", "standard container", and simply "container", and shall be deemed to meet the dimensional and structural specifications set forth in ISO 668.

As used herein, the term "containerized" is defined as being contained within or located in a shipping container.

The rooftop containerized HVAC module thus has the external dimensions and interfaces of an ISO 668 freight container such that is utilizes existing transport infrastructure with respect to handling, transportation, and storage. The rooftop containerized HVAC module can thus be handled anywhere in the world by ship, train, truck, etc. The rooftop containerized HVAC module may preferably be of the dimensions of an ISO designation 1AAA "40 foot high cube" container, an ISO designation 1 BBB "30 foot high cube" container, or an ISO designation 1CCC "20 foot high cube" container, though other ISO designations of containers could of course be utilized in the practice of the invention.

Figure 1:
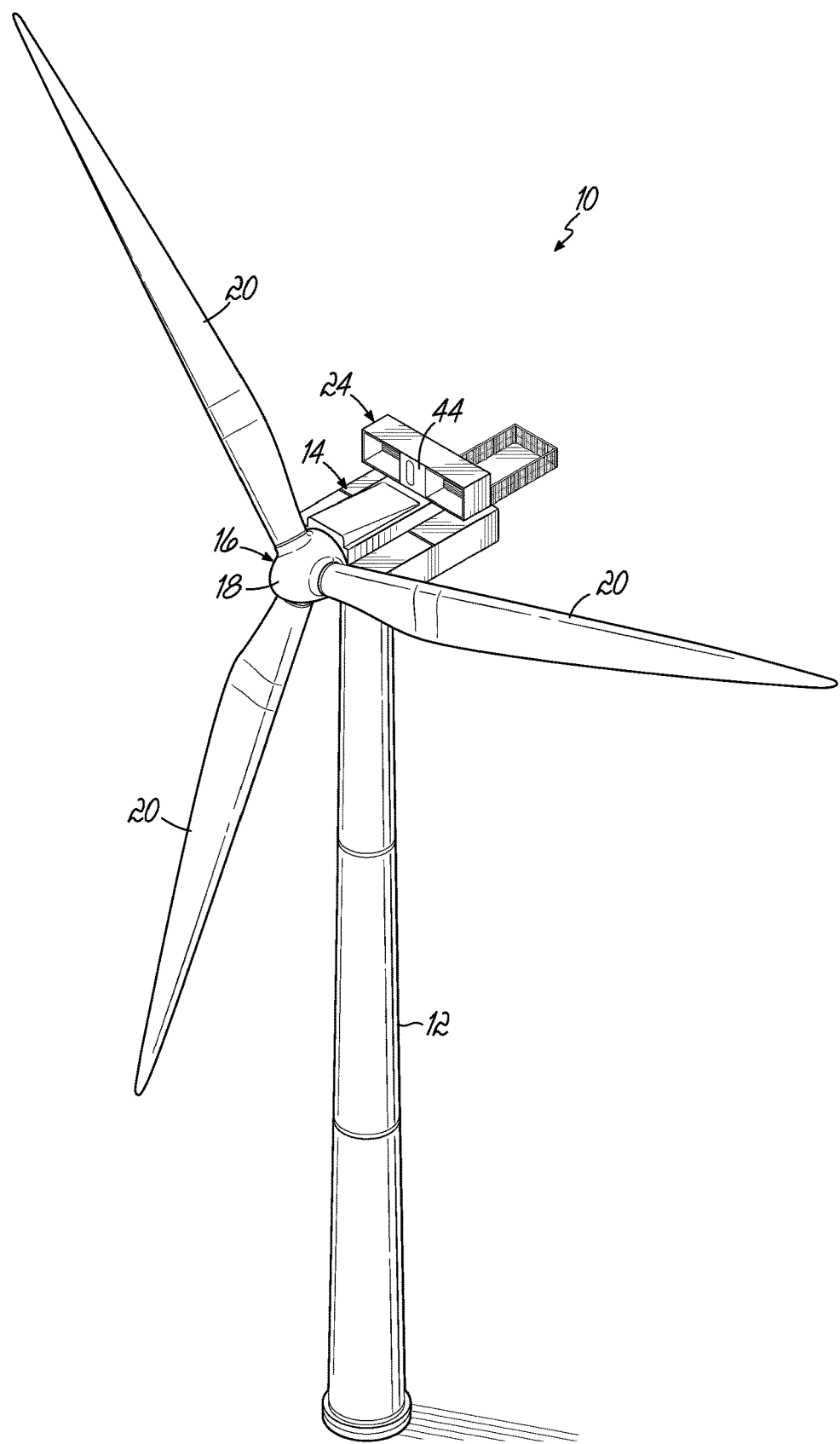
FIG. 1 is a front perspective view of a wind turbine generator having a modular rooftop HVAC system in accordance with the principles of the present invention.

To this end, and referring first to FIG. 1, a wind turbine generator 10 includes a tower 12, a nacelle 14 disposed at the apex of the tower 12, and a rotor 16 operatively coupled to a generator (not shown) housed inside the nacelle, and a gearbox (not shown) also housed inside the nacelle 14. In addition to the generator and gearbox, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found. The nacelle 14 defines a longitudinal axis LA and is configured to align its longitudinal axis LA with the direction of the incoming wind during the operation of the wind turbine.

The rotor 16 may include a central hub 18 and a plurality of blades 20 attached to the central hub 18 at locations distributed about the circumference of the central hub 18. In the representative embodiment, the rotor 16 includes three blades 20, however the number may vary. The blades 20, which project radially outward from the central hub 18, are configured to interact with passing air currents to produce rotational forces that cause the central hub 18 to spin about its longitudinal axis. The design, construction, and operation of the blades 20 are familiar to a person having ordinary skill in the art of wind turbine design and may include additional functional aspects to optimize performance. For example, pitch angle control of the blades 20 may be implemented by a pitch control mechanism (not shown) responsive to wind velocity to optimize power production in low wind conditions, and to feather the blades if wind velocity exceeds design limitations.

The rotor 16 may be coupled to the gearbox directly or indirectly via by a drive shaft (not shown). Either way, the gearbox transfers the rotation of the rotor 16 through a coupling (not shown) to the generator. Wind exceeding a minimum speed may activate the rotor 16, causing the rotor 16 to rotate in a direction substantially perpendicular to the wind, applying torque to the input shaft of the generator. The electrical power produced by the generator may be supplied to a power grid (not shown) or an energy storage system (not shown) for later release to the grid as understood by a person having ordinary skill in the art. In this way, the kinetic energy of the wind may be harnessed by the wind turbine 10 for power generation.

Figure 2:
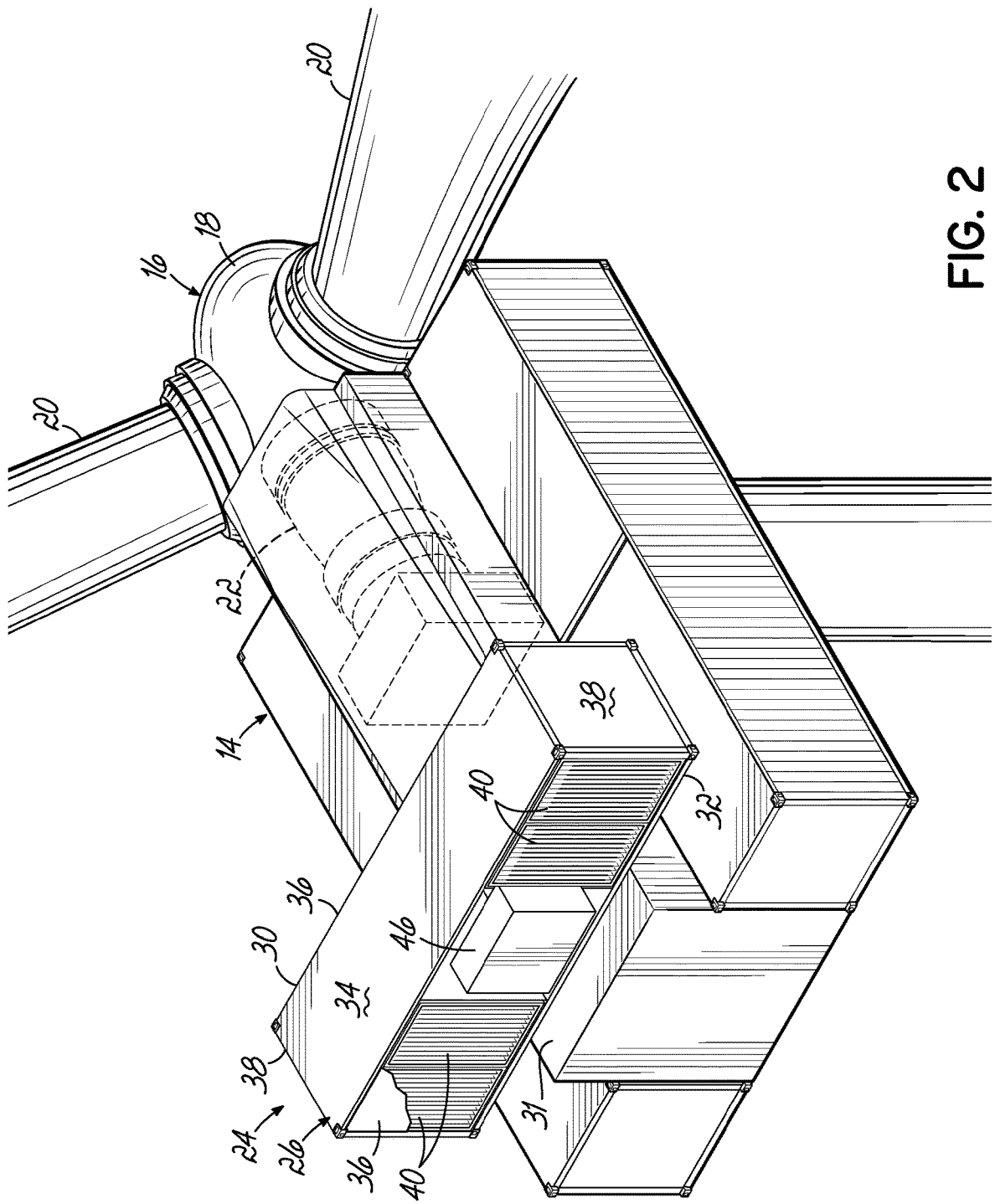
FIG. 2 is an enlarged rear perspective view of the nacelle and modular rooftop HVAC system of FIG. 1.
Figure 3:
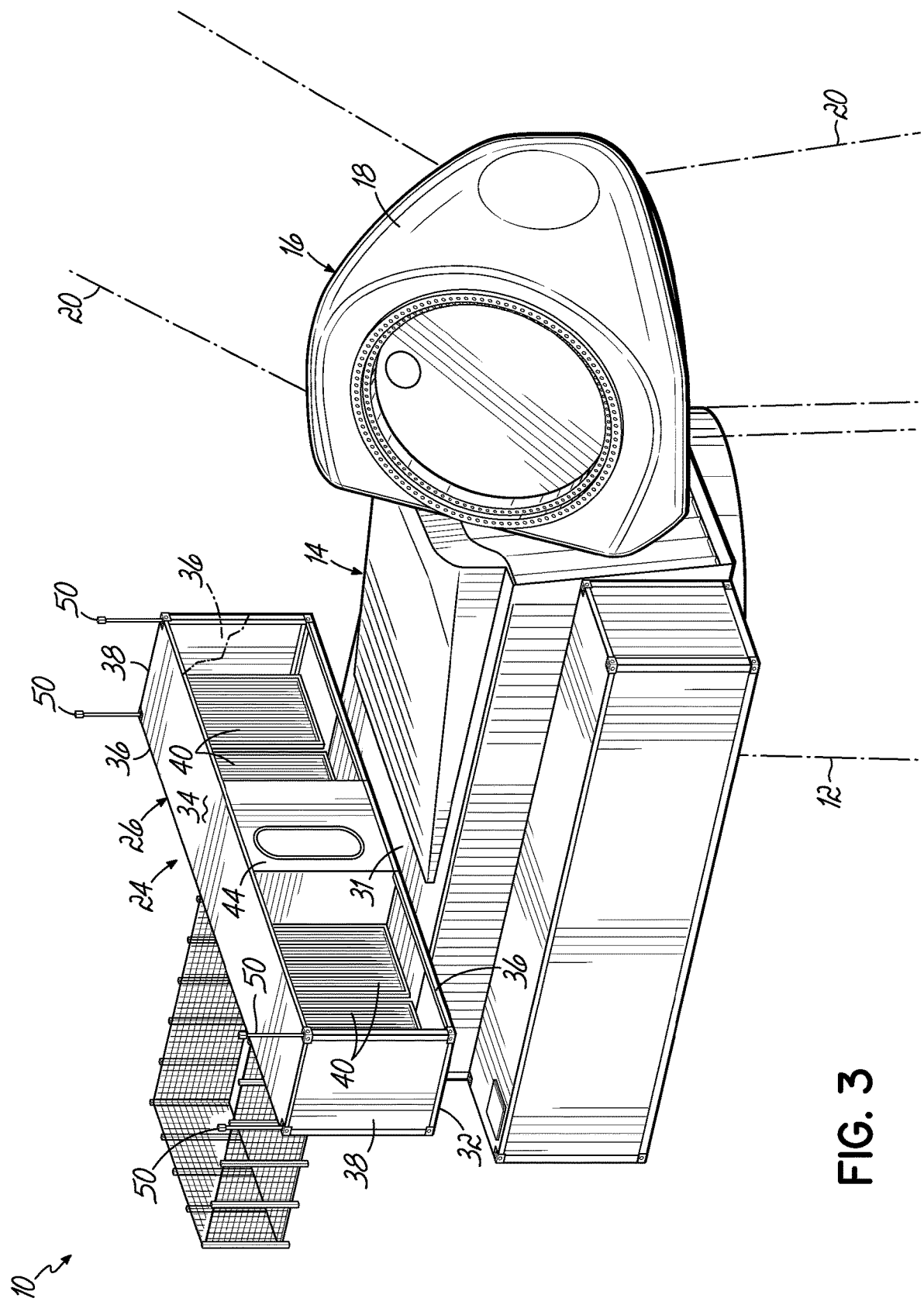
FIG. 3 is an enlarged front perspective view of the nacelle and modular rooftop HVAC system of FIG. 1.

The generator, gearbox, and possibly other components housed in the nacelle 14 generate a significant amount of heat during operation of the wind turbine 10. The generator, gearbox, and other components in the nacelle 14 may be characterized as heat-generating components 22 (FIG. 2). To optimize or improve operation of the wind turbine 10, the heat produced by these heat-generating components 22 must be properly managed and exhausted to the external environment. To this end, the wind turbine 10 may include a cooling system for transferring the heat from the heat-generating components 22 to the external environment. A cooling system 24 includes a thermal circuit (not shown) having a pump that circulates a working fluid, such as water or other suitable refrigerant, through conduit lines between the heat-generating components 22 in the nacelle 14, tower 12, or other portion of the wind turbine 10, and one or more heat exchangers, described in more detail below.

In accordance with the principles of the present invention, the cooling system or simply cooler 24 is a modular rooftop HVAC system 26 contained in a shipping container 30. The modular rooftop HVAC system 26 is mounted to the roof 31 of the nacelle 14. While the illustrated nacelle 14 is of a similar containerized modular construction, the modular rooftop HVAC system 26 of the present invention could just as well be mounted on and function with a standard non-containerized non-modular nacelle. As positioned, the modular HVAC system 26 is exposed to an external air flow that may be used to achieve a cooling effect.

Referring now to FIGS. 2-5, the shipping container 30 has a bottom plate or floor 32, a top plate or roof 34, a pair of opposed longer front and rear side walls 36, and a pair of opposed shorter gables or end walls 38. The longitudinal axis of the shipping container 30 is oriented generally perpendicular or transverse to the longitudinal axis of the nacelle 14. The shipping container 30 has one or more heat exchangers 40 therein, as will be described below in more detail.

The front and rear side walls 36 and the end walls 38 of the shipping container 30 can include openable (e.g., retractable) or removable portions to permit air flow through the shipping container 30 and hence through the heat exchangers 40.

The shipping container 30 can also include a machine room 44 for housing one or more of pumps for circulation of water between the heat exchangers 40, fans and/or blowers for circulating air between ambient and air-cooled modules in the nacelle 14, fans and/or blowers for ventilating the internals of the nacelle 14, a filtration system for removing particles, salt, and/or humidity from the air, hoses and/or ducts for guiding flow of liquid and air, mufflers and/or silencers for reducing noise emissions into the environment, related power supplies, surveillance, and control equipment, and a fire suppression system. All of this equipment is shown diagrammatically at 46.

The floor 32 of the shipping container 30 functions as a working platform during service and maintenance. To that end, the floor 32 can comprise a deck or grate, and can be surrounded by protective safety railings therearound. The roof 34 of the shipping container 30 functions as an air funnel to increase cooling efficiency during operation. The end walls 38 of the shipping container 30 also function as an air funnel to increase cooling efficiency during operation.

Figure 4:
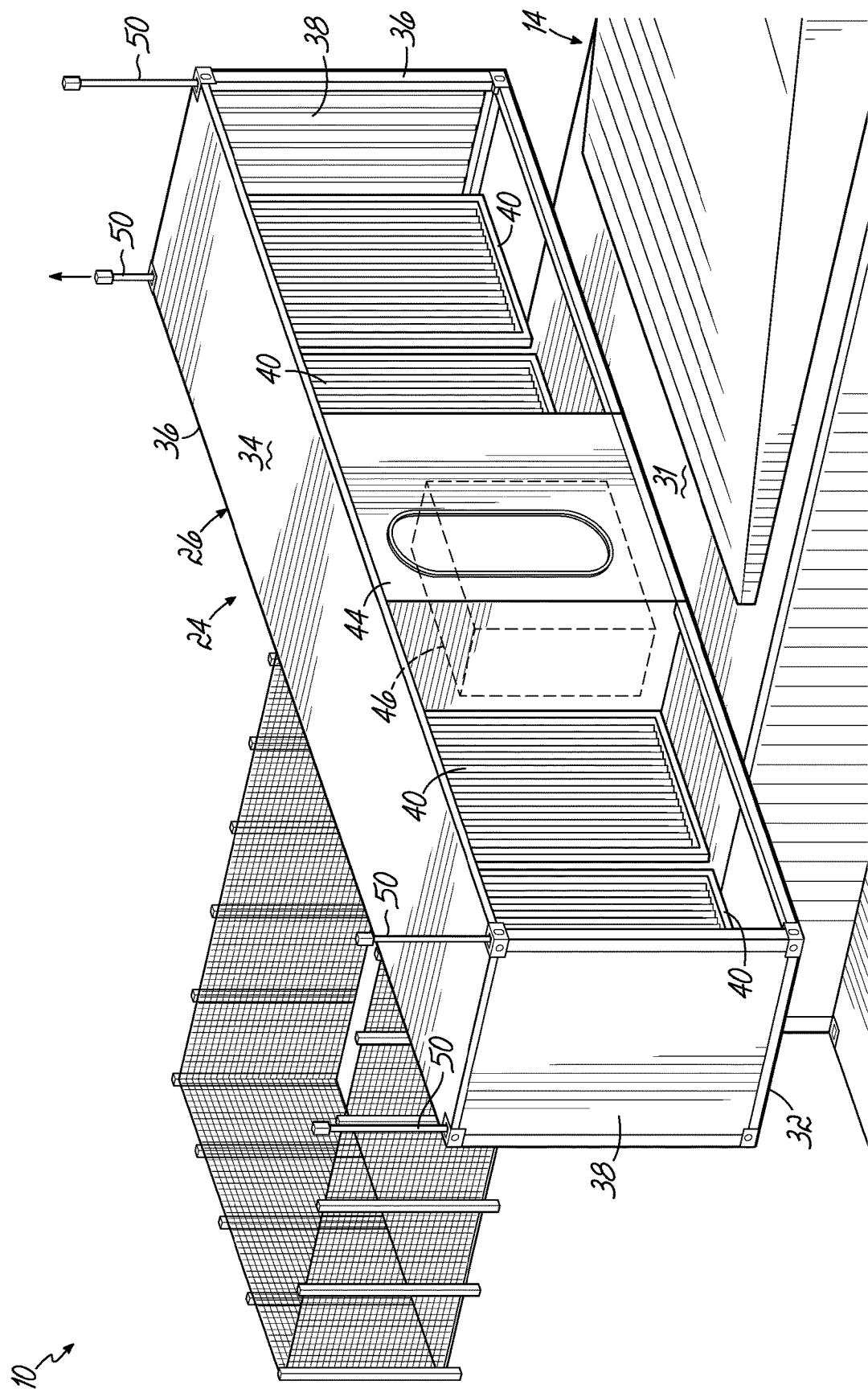
FIG. 4 is an enlarged front perspective view of the modular rooftop HVAC system of FIG. 1.
Figure 5:
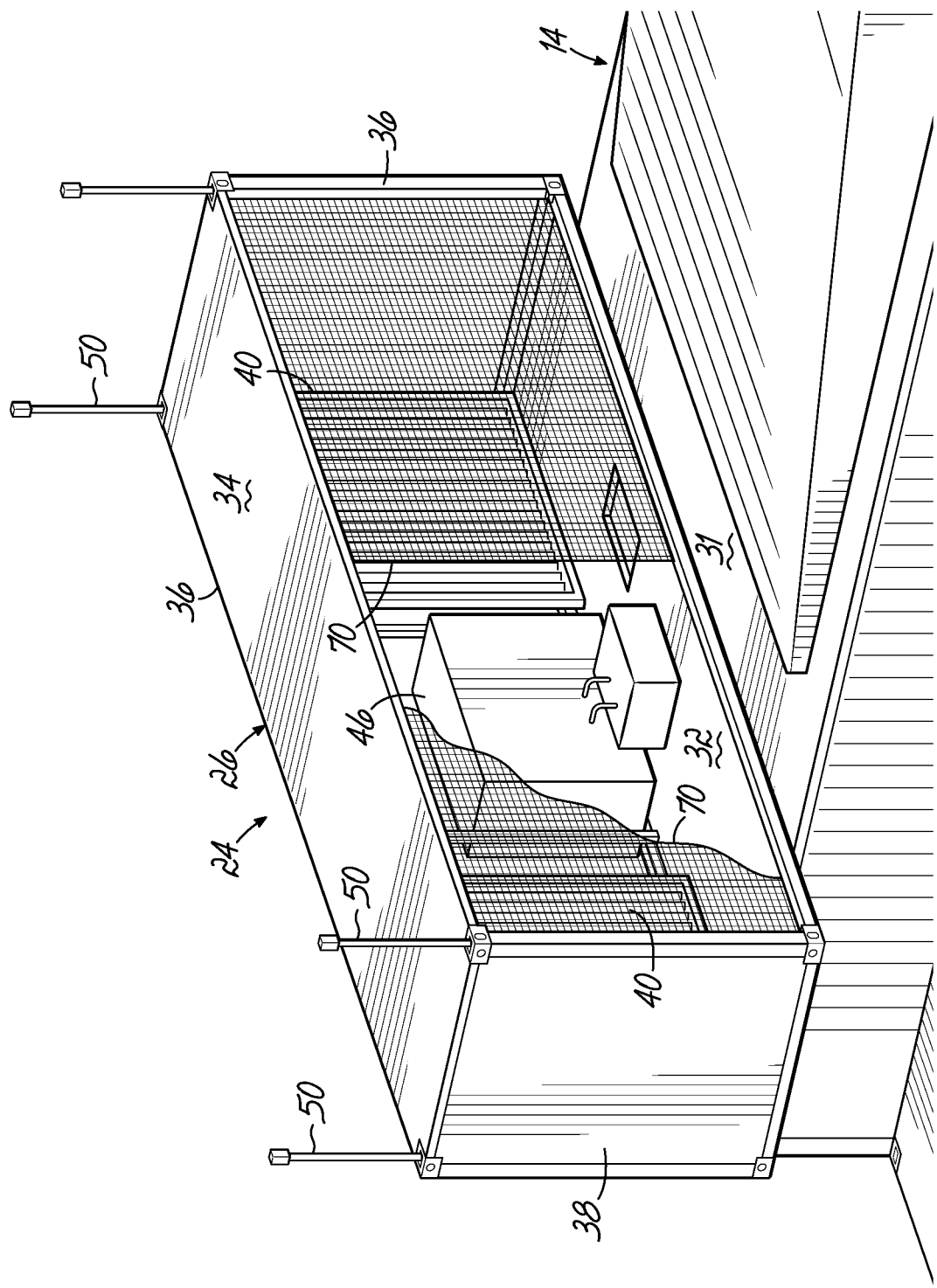
FIG. 5 is an enlarged front perspective view of a second embodiment of the modular rooftop HVAC system.
Figure 6:
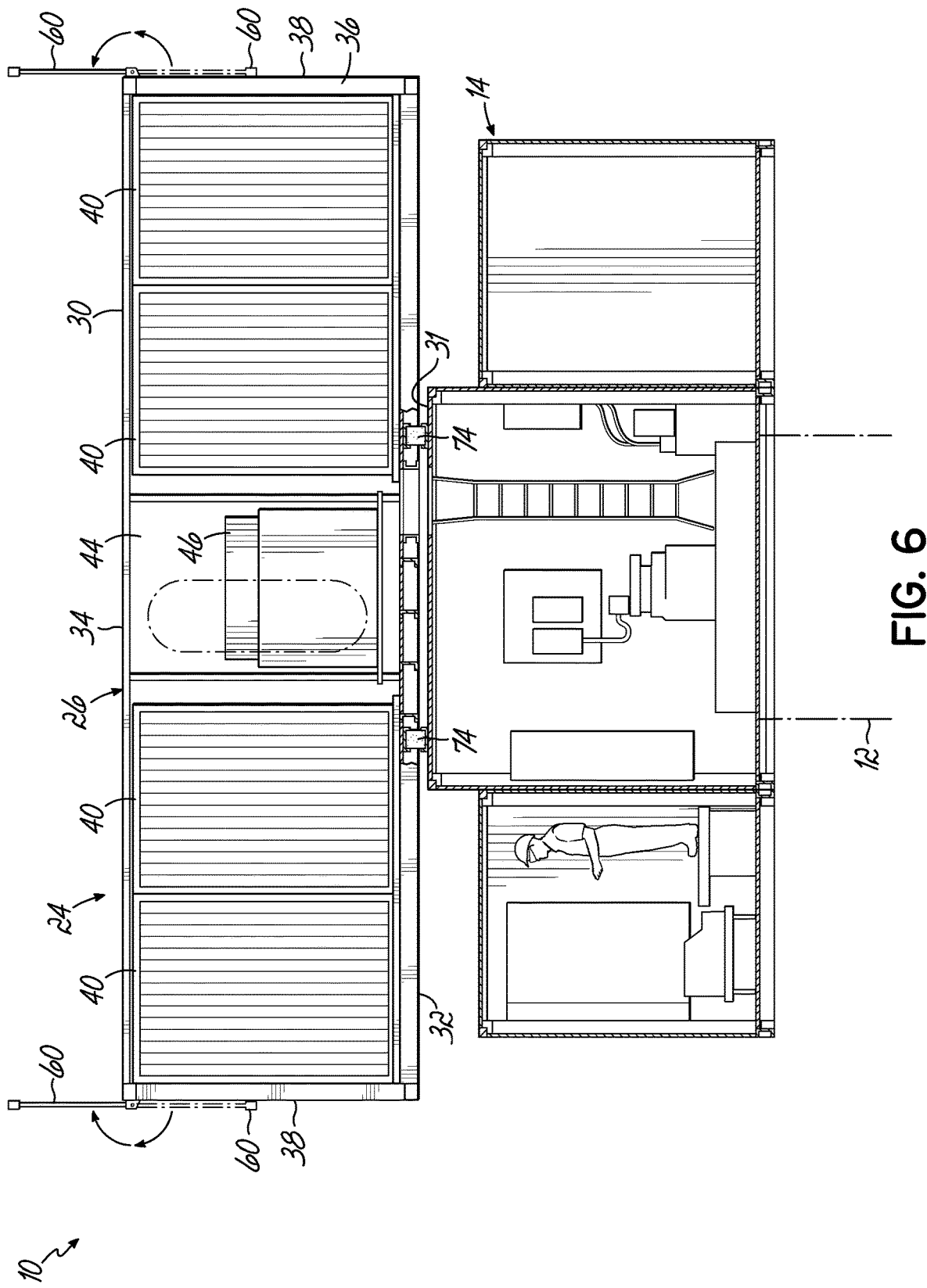
FIG. 6 is a front view of the modular rooftop HVAC system of FIG. 1.
Figure 7A:
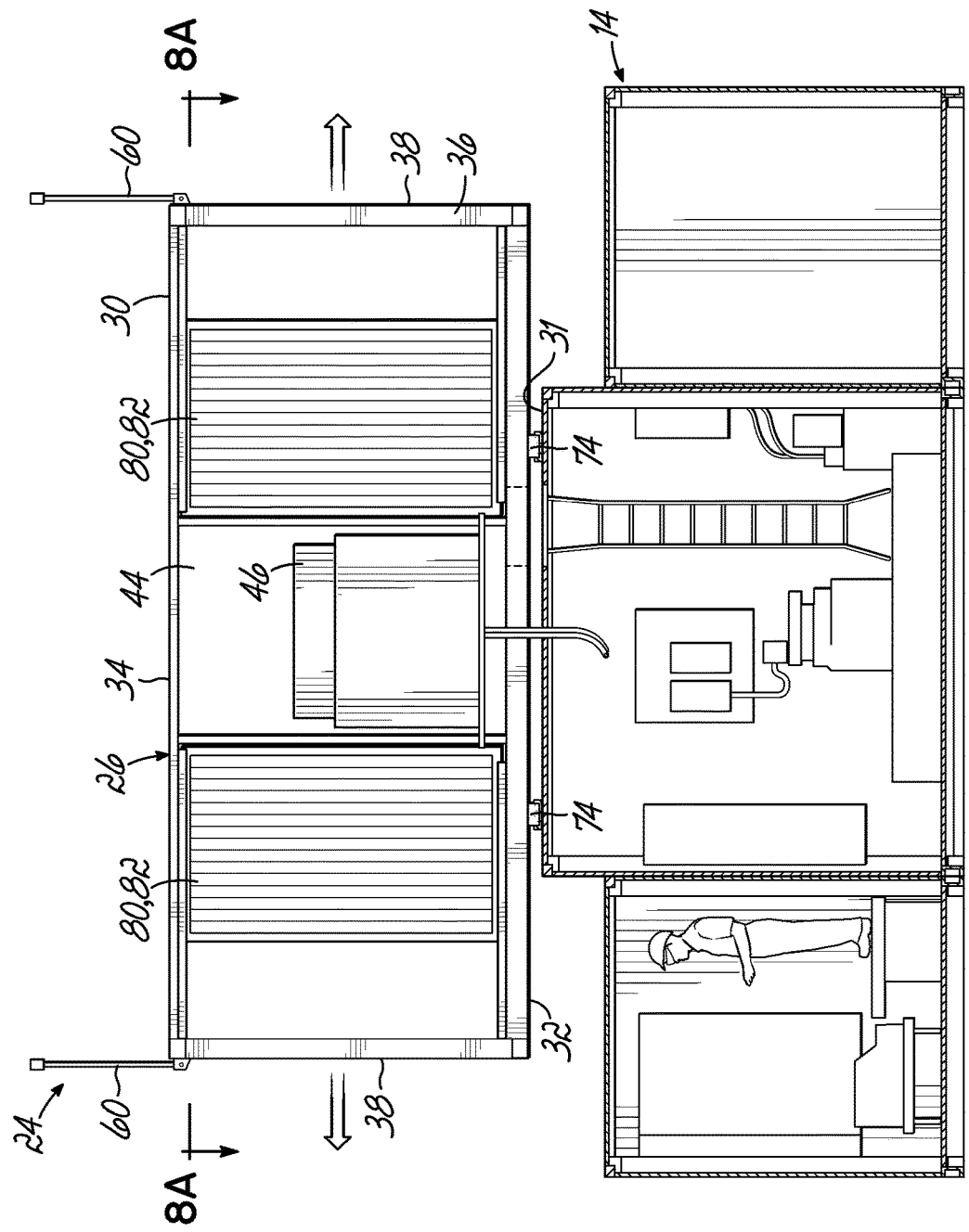
FIG. 7A is a front view of a third embodiment of the modular rooftop HVAC system having additional heat exchangers slidable into and out of the ends of the shipping container, the additional heat exchangers shown in the retracted stowed position.
Figure 7B:
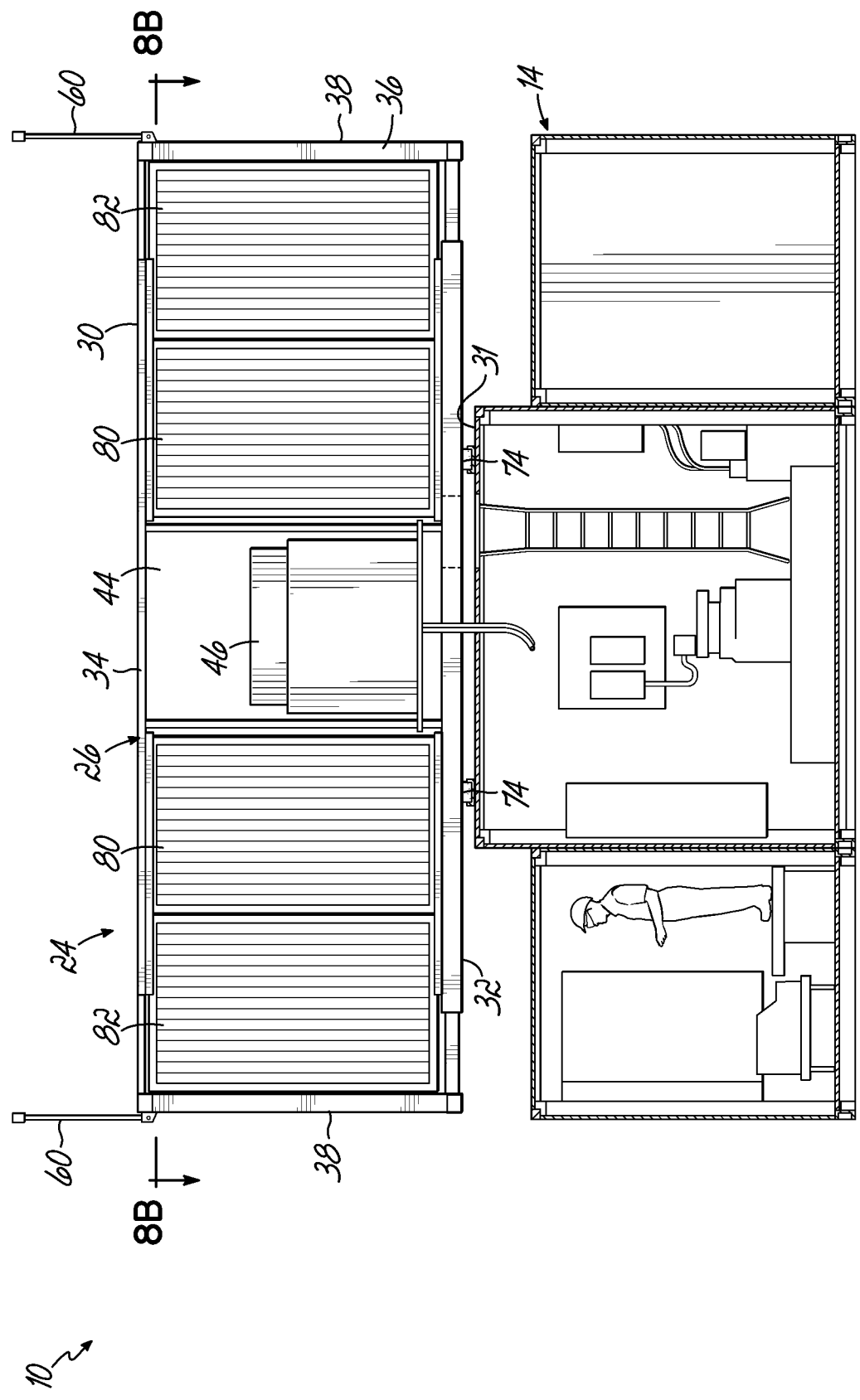
FIG. 7B is a view similar to FIG. 7A illustrating the additional heat exchangers in the extended deployed position.

With the rooftop containerized HVAC module 26 being the highest point on the wind turbine generator 10, it admits to having air traffic control lights mounted to it. To that end, air traffic control lights 50 can be slidably mounted to the container 30 at upper corners thereof as shown in FIGS. 4 and 5. Alternatively, air traffic control lights 60 can be pivotably mounted to the container 30 at upper corners thereof as shown in FIGS. 6, 7A, and 7B. The lights 50 and 60 can be slid or pivoted, as the case may be, out of the envelope of the container 30 to a deployed operable position, and slid or pivoted, as the case may be, into the envelope of the container 30 to a stowed shipping position.

As shown in FIG. 5, the shipping container 30 can include screen or mesh grid sections 70 that are exposed when the openable or removable sections of the front and rear side walls 36 of the shipping container 30 are opened or removed. In this way, the heat exchangers 40 are provided with a degree of protection from ice, hail, etc. In addition, the mesh grid sections 70 function as safety barriers for personnel working inside the container 30.

Referring now to FIGS. 6, 7A, and 7B, the rooftop containerized HVAC module 26 is preferably de-coupled from the structure of the nacelle 14 so as to not interact with the structural stiffness of the nacelle 14. To this end, the rooftop containerized HVAC module 26 is advantageously mounted to the nacelle with a minimum number (for example, three or four) of flexible, e.g. elastomeric, and/or pinned, releasable connectors 74, in order to reduce structural loads from being transmitted from the rooftop containerized HVAC module 26 to the nacelle 14. For example, the releasable connectors 74 may include elastomeric blocks (e.g., deformable rubber blocks) retained between fittings on the nacelle 14 and fittings on the module 26. Each connector 74 would preferably provide an amount of six degrees-of-freedom structural independence between the rooftop containerized HVAC module 26 and the nacelle 14 at each connection point. In addition to the releasable connectors 74 being used to releasably connect the module 26 to the nacelle 14, they can also be used to releasably connect a plurality of modules 26 to one another.

For example, in one embodiment, the nacelle 14 may include a group of rooftop containerized HVAC modules 26 (i.e., two or more containerized HVAC modules) each coupled to the nacelle (14) and/or to an adjacent containerized HVAC module 26 via releasable connectors 74. One of the containerized HVAC modules 26 may be a base module that is connected to the nacelle 14, and another of the containerized HVAC modules 26 may be an extension module that is connected to the base module. In one embodiment, the base module may include the machine room 44 while the extension module may include the one or more heat exchangers 40. The number of base modules and extension modules may be tailored to the specific application to provide the desired cooling capacity. For example, if desired the heat exchanges 40 may be provided only in one or more extension modules.

Figure 8B:
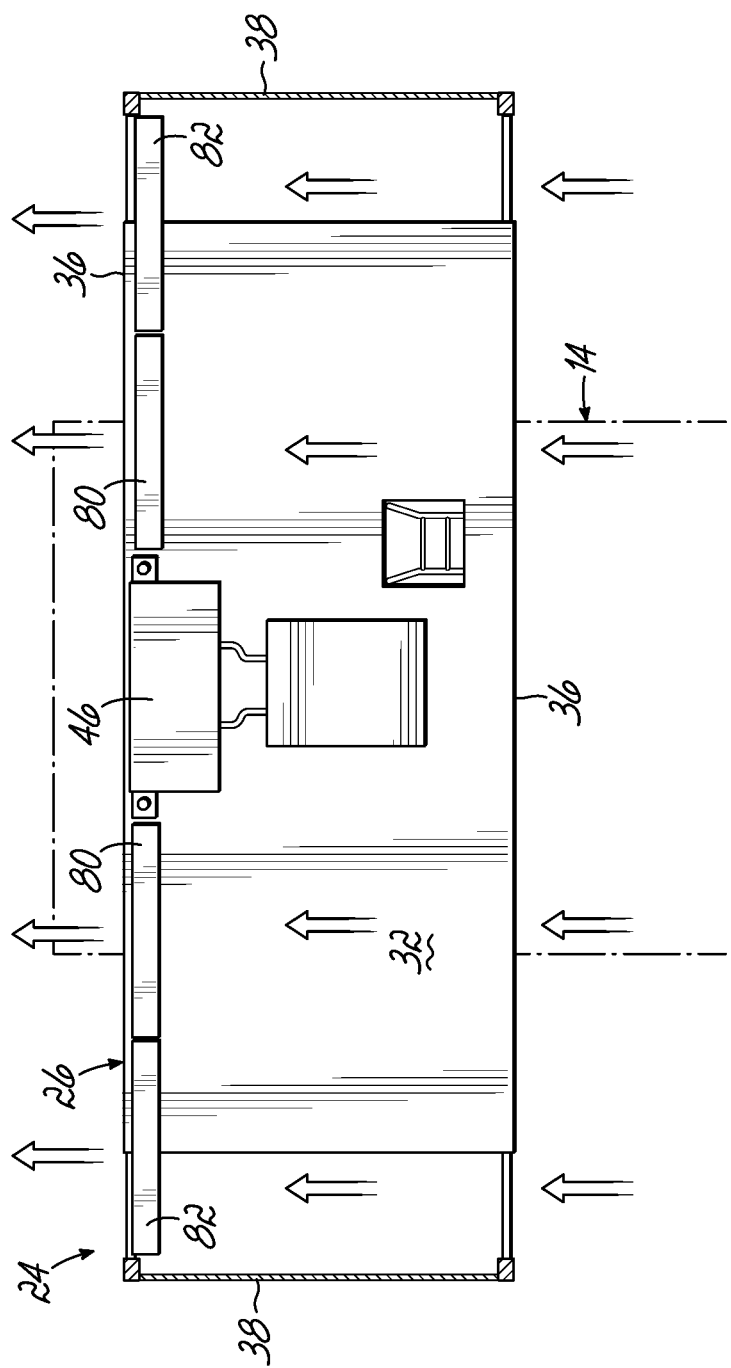
FIG. 8B is a cross-sectional view taken along line 8B-8B in FIG. 7B.

Referring now to FIGS. 8A and 8B, the rooftop containerized HVAC module 26 can include fixed 80 and sliding 82 heat exchangers. The sliding heat exchangers 82 can slide through or out of openable or removable sections of the end walls 38 of the container 30. In this manner, the sliding heat exchangers can be positioned within the envelope of the container 30 for shipping, and then slid out to their deployed operable position once the rooftop containerized HVAC module 26 is mounted to the nacelle 14.

Similarly, and referring now to FIGS. 9A and 9B, the rooftop containerized HVAC module 26 can include fixed 90 and pivoting 92 heat exchangers. The pivoting heat exchangers 92 can pivot through or out of openable or removable sections of the end walls 38 of the container 30. In this manner, the sliding heat exchangers can be positioned within the envelope of the container 30 for shipping, and then pivoted out to their deployed operable position once the rooftop containerized HVAC module 26 is mounted to the nacelle 14.

The present invention provides a number of novel features. A cooler top is provided in a standard shipping container as a rooftop containerized HVAC module. The rooftop containerized HVAC module is de-coupled from the nacelle structure so as to not interact with the structural stiffness of the nacelle. The rooftop containerized HVAC module can include a pump station. The rooftop containerized HVAC module can include nacelle conditioning. The rooftop containerized HVAC module can include supplemental or additional slide-out or fold-out cooler wings/heat exchangers, and as such is scalable. The rooftop containerized HVAC module provides access and service in safe environment with the right precautions. The rooftop containerized HVAC module can include a Fire Suppression System (FSS).

The rooftop containerized HVAC module can be used on nacelles that employ a similar containerized modularity as well as on standard non-containerized nacelles. The rooftop containerized HVAC module can be manufactured, transported, and otherwise provided as a self-contained component by a sub-supplier.

Thanks to the container structure floor and end walls forming a working platform, the rooftop may be wider than the nacelle, i.e. heat exchangers can jut out over the nacelle sides. This offers an opportunity to increase cooling surface without increasing height, with respect to manufacturability of cooling panels, transportability of the assembly, and loads on the nacelle structure.

For very high ambient temperatures, a second set of heat exchangers may be arranged on top of the rooftop container, using the container roof as both structural support during operation and working platform during service and maintenance. Alternatively, additional heat exchangers may be connected to the end walls of the container, with hinges that allow the additional heat exchangers to fold in for transport, service, and maintenance. For that matter, a second rooftop containerized HVAC module could be stacked atop or side-by-side a first rooftop containerized HVAC module to provide additional cooling capability via scalability.

Since the rooftop containerized HVAC module now becomes the highest point on the wind turbine generator, it admits to having air traffic control lights mounted to it. The air traffic control lights can be slidably or pivotably mounted to the container and configured to slide or pivot out of the envelope of the container to a deployed operable position, and slide or pivot into the envelope of the container for shipping.

The rooftop containerized HVAC module can also include a two-phase refrigeration system in addition to or in lieu of the single-phase water/air cooling system.

The rooftop containerized HVAC module is advantageously mounted to the nacelle with a minimum number of flexible connectors, in order to reduce structural loads from being transmitted from the rooftop containerized HVAC module to the nacelle. Each flexible connector would preferably provide an amount of six degrees-of-freedom structural independence between the rooftop containerized HVAC module and the nacelle at each flexible connection point.

In order to provide personnel safety and to protect from ice/hail damage to the heat exchangers, a mesh or grid panel can be provided at each location in the front and back side walls of the container in the locations where the walls include the openable or removable portions which permit air flow through said shipping container and the heat exchangers.

Extra heat exchangers can be slidably or pivotably mounted to the container and be configured to slide or pivot out of the envelope of the container to a deployed operable position, and slide or pivot into the envelope of the container for shipping.

The container can include a false floor and/or a false ceiling to house ductwork and/or water tanks for the cooling system.

The wind turbine generator power rating and the weather conditions (hot vs. cold) determine the required cooling capability/capacity of the rooftop containerized HVAC module. A plurality of rooftop containerized HVAC modules can be assembled, each with a different cooling capacity. Then, once the variables of wind turbine generator power rating and weather conditions are selected or otherwise become known or specified, the appropriate rooftop containerized HVAC module with the appropriate cooling capacity can be selected for that specific wind turbine generator and those specific weather conditions.

Figure 10:
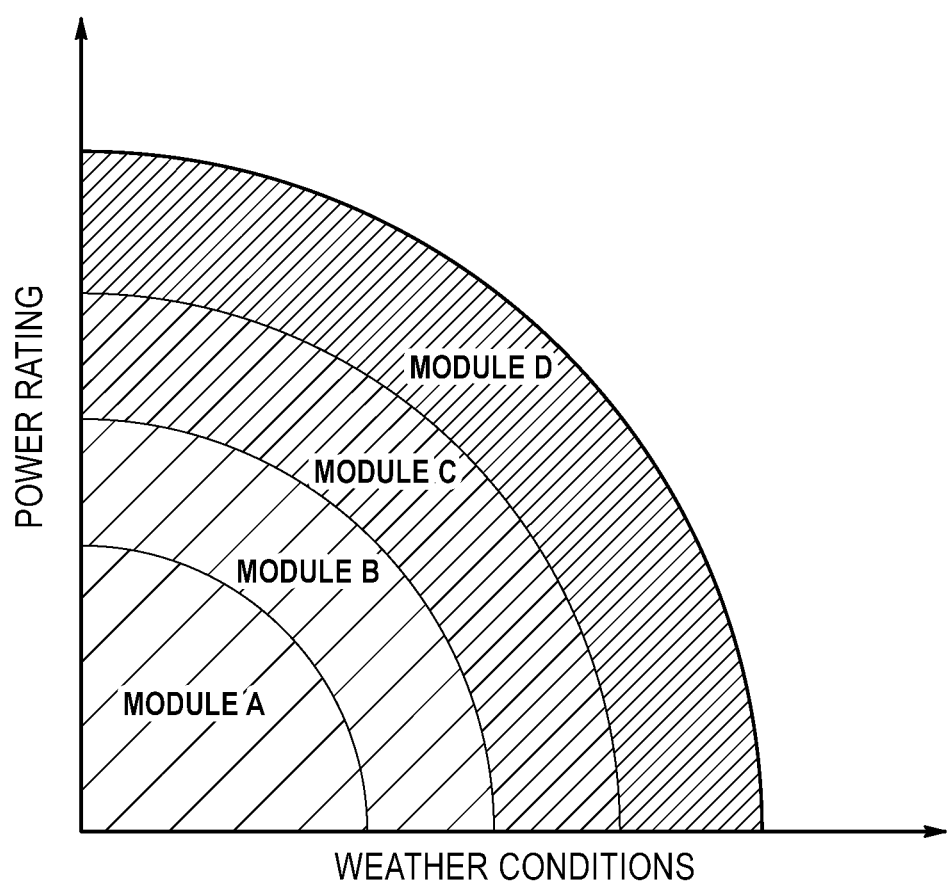
FIG. 10 is a schematic illustration of using a finite number of rooftop HVAC systems for use in a wide range of wind turbine power ratings and weather conditions.

In one embodiment, the technique of binning can be utilized in the practice of this aspect of the invention. FIG. 10 is a schematic illustration that demonstrates the concept of binning wherein the horizontal axis is weather conditions and the vertical axis is the power rating of the wind turbine generator 10. The weather conditions may be quantified using one or more characteristics of the wind turbine site. For example, average ambient temperature, average wind speeds, and/or other weather-related site characteristics may be used to quantify weather conditions. In accordance with this figure, there are four rooftop containerized HVAC modules 26, with each module having a different cooling capacity. For example, Module A may have the smallest cooling capacity, Module D may have the largest cooling capacity, Module B may have a cooling capacity larger than Module A and less than Module D, and Module C may have a cooling capacity larger than Module B and less than Module D. In this way, the modules 26 have an increasing cooling capacity from Module A to Module D.

Accordingly, Module A may be well suited for a very cold environment and/or a wind turbine having a relatively small power rating. On the other extreme, Module D may be well suited for a very hot environment and/or a wind turbine having a relatively high power rating. Modules B and C would be intermediate these extremes. The point of FIG. 10 is that there is a range of weather condition/power rating values for which the cooling capacity of each of Modules A-D is sufficient to provide the necessary cooling. Thus, when one ascertains the weather conditions at the wind turbine site and the power rating of the planned wind turbine, the appropriate rooftop containerized HVAC module 26 may be selected from the plurality of containerized HVAC modules. While FIG. 10 describes four containerized HVAC modules 26 for purposes of explanation, a manufacture may provide a finite set of modules for selection (e.g., between 2 and 6 modules). Furthermore, while the regions associated with each module is identified by circular arcs, this is merely for purpose of explanation. It should be recognized that the boundary of each of the regions may be formed by other regular or irregular segments. In summary, a particular HVAC module with associated cooling capacity can be paired with a plurality of wind turbine generators over a range of weather conditions and power ratings, as long as the HVAC module cooling capacity is at least as great as the cooling requirement for a selected one of the wind turbine generators within the plurality.

The rooftop containerized HVAC module includes a number of additional novel features and advantages. Air intakes, fans/blower, and filters can be included in machine room in the rooftop containerized HVAC module. The rooftop containerized HVAC module can have a double bottom, with air ducts integrated in the interspace, connected to the pressure side of these fans/blowers. The rooftop containerized HVAC module sideships can have a double roof, with air ducts integrated in the interspace, these air ducts connected to the air ducts in the double bottom of the rooftop containerized HVAC module. The rooftop containerized HVAC module can have a series of consumers (several of the same, or several different) connected to the air ducts in the double roof. The rooftop containerized HVAC module can have air outlets in the lower part of the sideships. The rooftop containerized HVAC module admits of a variant where air flow distribution to consumers is realized by individual fans/blowers and ducts to each consumer, and an alternative where louvers, flaps, or throttles between the ducts allow re-distribution of air flows between consumers.

The invention admits of describing the ambient conditions ("user factors") and product properties for which is contained the functional variance in the rooftop containerized HVAC module, for an else unchanged, standardized nacelle, to wit, the bi-variate distribution of hours at ambient temperature X and wind speed Y; altitude, air density, and humidity; grid frequency; and the bi-variate distribution of hours at consumer loss X and wind speed Y (which includes the effect of rotor diameter vs. nominal power rating aka capacity factor).

The rooftop containerized HVAC module includes a number of further novel features and advantages: The cooler top is in a container. The cooler top container is de-coupled from the nacelle structure and doesn't interact with the nacelle stiffness (structure)—the cooler top should be independent from the nacelle structure and vice versa by removing over constraints; this could be accomplished by removing the 4th connection and introducing a 3-point pinned connection solution in the cooler top container and nacelle with independent profiles acting as the interface. The cooler top container can include the pump unit—advantage of removing air from nacelle and coolant spillage is collected on the box. The cooler top container can include mesh in front of the panels to protect them from ice and hail. The cooler top container can include nacelle air cooling, via either air extraction or air in. The cooler top container can include a converter for air cooling. The cooler top container can include fold-out or slide-out cooler top wings—these could be V-shaped accordion panels or sliding panels or folding panels. The cooler top container can include a fire suppression system ("FSS")—with appropriate attention given to piping considerations (likely only able to use the front opening which will bring some complexity due to routing). The cooler top container can be segmented by zones to guarantee cx protection with boxes. The cooler top container can provide access and service in safe environment with the right precautions.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

The invention claimed is:

1. A wind turbine generator, comprising:
a tower,
a nacelle rotatably mounted to said tower, said nacelle having a longitudinal axis and being configured to align the longitudinal axis with the direction of the incoming wind during operation of said wind turbine generator,
one or more heat-generating components housed in said wind turbine generator,
a self-contained HVAC module having a floor, a roof, and a plurality of side walls that define an interior, and
at least one heat exchanger disposed in the interior of the module,
wherein the module is mounted on a roof of said nacelle and said at least one heat exchanger is operably connected to said one or more heat-generating components for cooling said heat-generating components.

2. The wind turbine generator of claim 1, wherein said module comprises a shipping container having a longitudinal axis, the longitudinal axis of said shipping container being oriented generally perpendicular to the longitudinal axis of said nacelle.

3. The wind turbine generator of claim 1, wherein said module further has a machine room therein, said machine room comprising at least one component selected among pumps, tanks, expansion vessels, valves, fans, and/or spillage trays.

4. The wind turbine generator of claim 2, wherein said floor of said shipping container functions as a working platform during service and maintenance, said floor comprising a grating or a deck, said module including safety railings around said grating or deck.

5. The wind turbine generator of claim 2, wherein one or more of said plurality of side walls, and/or roof of said shipping container include openable or removable portions to permit air flow through said shipping container and said at least one heat exchanger during operation.

6. The wind turbine generator of claim 1, wherein said module further includes one or more elements selected from the group consisting of:
water/air heat exchangers,
pumps for circulation of water between said water/air heat exchangers and heat exchangers on water-cooled modules in said nacelle,
fans and/or blowers for circulating air between ambient and air-cooled modules in said nacelle,
fans and/or blowers for ventilating internals of said nacelle,
a filtration system for removing particles, salt, and/or humidity from the air,
hoses and/or ducts for guiding flow of liquid and air,
a fire suppression system for extinguishing fires in the nacelle,
mufflers and/or silencers for reducing noise emissions into the environment, and
related power supplies, surveillance, and control equipment.

7. The wind turbine generator of claim 2, wherein said module further includes sliding and/or pivoting heat exchangers configured to slide and/or pivot through or out of openable or removable sections of one or more of said plurality of side walls of said container, said sliding and/or pivoting heat exchangers positionable within the envelope of said container for shipping, and deployable to an operable position once said module is mounted to said nacelle, thereby providing a scalable cooling capability to said module.

8. A self-contained HVAC module having a floor, a roof, and a plurality of side walls that define an interior including at least one heat exchanger disposed therein, said module configured to be mounted on a roof of a nacelle of a wind turbine generator, and said at least one heat exchanger configured to be operably connected to one or more heat-generating components in the wind turbine generator for cooling the heat-generating components.

9. The self-contained HVAC module of claim 8, wherein said module comprises a shipping container.

10. The self-contained HVAC module of claim 8, wherein said module further has a machine room therein, said machine room comprising at least one component selected among pumps, tanks, expansion vessels, valves, fans, and/or spillage trays.

11. The self-contained HVAC module of claim 9, wherein said floor of said shipping container functions as a working platform during service and maintenance, said floor comprising a grating or a deck, said module including safety railings around said grating or deck.

12. The self-contained HVAC module of claim 9, wherein one or more of said plurality of side walls, and/or roof of said shipping container include openable or removable portions to permit air flow through said shipping container and said at least one heat exchanger during operation.

13. The self-contained HVAC module of claim 8, wherein said module further includes one or more elements selected from the group consisting of:
water/air heat exchangers,
pumps for circulation of water between said water/air heat exchangers and heat exchangers on water-cooled modules in said nacelle,
fans and/or blowers for circulating air between ambient and air-cooled modules in said nacelle,
fans and/or blowers for ventilating internals of said nacelle,
a filtration system for removing particles, salt, and/or humidity from the air,
hoses and/or ducts for guiding flow of liquid and air,
a fire suppression system for extinguishing fires in the nacelle,
mufflers and/or silencers for reducing noise emissions into the environment, and
related power supplies, surveillance, and control equipment.

14. The self-contained HVAC module of claim 9, further including sliding and/or pivoting heat exchangers configured to slide and/or pivot through or out of openable or removable sections of one or more of said plurality of side walls of said container, said sliding and/or pivoting heat exchangers positionable within the envelope of said container for shipping, and deployable to an operable position once said module is mounted to said nacelle, thereby providing a scalable capability to said module.

15. A group of at least two self-contained HVAC modules according to claim 9, wherein one of said modules is a base module connected to said nacelle and the other of said modules is an extension module connected to said base module.

16. The group of claim 15, wherein said base module has said machine room and said extension module has said at least one heat exchanger.

17. A wind turbine generator, comprising:
a tower,
a nacelle rotatably mounted to said tower, said nacelle having a longitudinal axis and being configured to align the longitudinal axis with the direction of the incoming wind during operation of said wind turbine generator,
one or more heat-generating components housed in said wind turbine generator, and
a group of containerized HVAC modules according to claim 15.

18. A method comprising:
providing a plurality of self-contained HVAC modules, each module having a floor, a roof, and a plurality of side walls that define an interior including at least one heat exchanger disposed therein, and each module having a different cooling capacity,
determining the cooling requirement of a particular wind turbine generator from the power rating of the wind turbine generator and the weather conditions the wind turbine generator will be subjected to,
selecting the self-contained HVAC module from the plurality of self-contained HVAC modules that has a cooling capacity at least as great as the cooling requirement of the particular wind turbine generator, and
installing the selected self-contained HVAC module on the wind turbine generator.

* * * * *

UNITED STATES PATENT AND TRADEMARK OFFICE
CERTIFICATE OF CORRECTION

PATENT NO. : 12,247,551 B2
APPLICATION NO. : 18/276682
DATED : March 11, 2025
INVENTOR(S) : Jens Demtröder et al.

Page 1 of 1

It is certified that error appears in the above-identified patent and that said Letters Patent is hereby corrected as shown below:

In the Claims

Column 12, Claim 15, Line 26 change "claim 9" to -- claim 8 --.

Signed and Sealed this
Twenty-second Day of July, 2025

Coke Morgan Stewart
*Acting Director of the United States Patent and Trademark Office*